(12) United States Patent
Coleman

(10) Patent No.: US 6,956,992 B2
(45) Date of Patent: Oct. 18, 2005

(54) OPTICAL FIBER COUPLER HAVING A RELAXED ALIGNMENT TOLERANCE

(75) Inventor: Christopher L. Coleman, Santa Clara, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 196 days.

(21) Appl. No.: 10/210,598

(22) Filed: Jul. 31, 2002

(65) Prior Publication Data

US 2004/0022488 A1 Feb. 5, 2004

(51) Int. Cl.$^7$ .............................. G02B 6/32; G02B 6/24
(52) U.S. Cl. .......................................... 385/33; 385/31
(58) Field of Search .............................. 385/33–38, 31

(56) References Cited

U.S. PATENT DOCUMENTS

| | | | |
|---|---|---|---|
| 4,732,448 A | | 3/1988 | Goldenberg |
| 5,370,643 A | | 12/1994 | Krivoshlykov et al. |
| 5,446,816 A | | 8/1995 | Shiraishi et al. |
| 5,511,140 A | | 4/1996 | Cina et al. |
| 5,555,333 A | * | 9/1996 | Kato ............................ 385/89 |
| 5,557,693 A | * | 9/1996 | Stevens et al. ............... 385/24 |
| 5,642,233 A | | 6/1997 | Kyouya et al. |
| 5,675,685 A | * | 10/1997 | Fukuda et al. ................. 385/89 |
| 5,680,493 A | | 10/1997 | Naitoh |
| 5,737,462 A | | 4/1998 | Whitehouse et al. |
| 5,774,239 A | | 6/1998 | Feldman et al. |
| 6,112,001 A | | 8/2000 | Kishida et al. |
| 6,112,002 A | | 8/2000 | Tabuchi |
| 6,120,191 A | | 9/2000 | Asakura et al. |
| 6,193,401 B1 | * | 2/2001 | Girkin et al. ................ 362/551 |
| 6,272,269 B1 | * | 8/2001 | Naum ......................... 385/43 |
| 6,504,975 B1 | * | 1/2003 | Yamagata et al. ............. 385/33 |

FOREIGN PATENT DOCUMENTS

| | | | | |
|---|---|---|---|---|
| EP | 1033597 A1 | | 9/1999 | |
| EP | 1235281 A1 | | 7/2000 | |
| GB | 2370653 A | | 12/2001 | |
| JP | 04273206 A | * | 9/1992 | ............ G02B 6/42 |
| WO | WO 00/17691 | * | 3/2000 | ............ G02B 6/42 |

* cited by examiner

Primary Examiner—Michelle R. Connelly-Cushwa

(57) ABSTRACT

An optical coupler converts a light distribution from a light source into a small angle distribution that extends over a volume larger than the variations in the alignment of an optical fiber. In one embodiment, a diffractive or hybrid diffractive/refractive bifocal lens forms first and second images of the light source respectively in first and second image planes. An input face of the optical fiber is between the first and second image planes and receives light diverging from the first image plane and light converging toward the second image plane. The net optical power coupling into the fiber is uniform over a large range of fiber positions and provides the optical coupler with a relaxed tolerance for misalignment of the fiber or the light source. The relaxed alignment tolerance facilitates low cost manufacture of multi-channel optical transmitters using single-mode optical fibers.

4 Claims, 3 Drawing Sheets

OPTICAL FIBER COUPLER HAVING A RELAXED ALIGNMENT TOLERANCE

BACKGROUND

A single-mode optical fiber transports light at small angles relative to the optical axis of the fiber. Unfortunately, light sources such as edge-emitting semiconductor lasers that provide optical signals for transmission on optical fibers often have large-angle light patterns that are difficult to efficiently couple into a single-mode optical fiber. Prior solutions for coupling the light from edge-emitting semiconductor lasers into optical fibers have included direct "butt-coupling" and use of a lens to image the laser light onto the input face of the fiber.

Butt-coupling involves placing the input face of an optical fiber at or near the laser output aperture without additional intervening optics. This approach often captures only a small fraction (typically less than 10%) of the laser power. Butt-coupling is also intolerant of small relative movements or misalignments between the laser and the fiber. For a single-mode fiber having a core that is about 9 $\mu$m in diameter, a relative movement on the order of 1 $\mu$m can cause large changes in the amount of coupled power.

A lens between a laser and an optical fiber can image the laser light onto the fiber core to capture a larger fraction of the laser power. With a high magnification, the lens can convert the large-angle light pattern from the laser into a small-angle pattern that has a near 100% coupling into the optical fiber. However, a high magnification imaging system is very sensitive to relative misalignments of the laser, lens, and optical fiber. For example, for a 5× magnification, a lateral laser-to-lens shift or misalignment by a distance Y shifts the imaged light by 5Y, and an axial laser-to-lens shift or misalignment by a distance Z shifts the imaged light off the fiber by a distance 25Z.

The strong misalignment sensitivities of optical fiber couplers for single mode optical fibers have required aligning the laser, the lens, and the fiber to accuracies less than 1 $\mu$m along all three axes. Further, to maintain a consistent and adequate power coupling, the precise alignment in an optical fiber coupler must be maintained despite jarring that may occur during assembly, integration, or use of the optical fiber coupler and despite thermal expansion of the elements and packaging of the optical fiber coupler. Achieving and maintaining the necessary alignment accuracies can be time consuming and expensive tasks. For high-volume, low cost manufacturing, coupling methods and structures are needed that provide a high and consistent power coupling efficiency while tolerating larger alignment errors.

SUMMARY

In accordance with an aspect of the invention, an optical fiber coupler contains an optical element or system such as a bifocal lens that distributes optical power over a volume, rather than focusing the optical power into a single image plane. The power distribution has a small angular distribution and is nearly uniform throughout the volume, which allows for movement or misalignment of the optical fiber while still providing a consistent and suitable efficiency for coupling laser power into the optical fiber. This allows manufacture of single-mode fiber transmitters without requiring expensive components or high-precision alignment equipment. Compared to butt-coupling solutions, the distributed power coupling systems can provide both higher efficiency and greater tolerance of alignment errors. Compared to traditional optical coupling systems using lenses, the systems in accordance with the present invention can greatly improve alignment tolerances with an acceptable reduction in best-case coupling efficiency.

One embodiment of the invention is a device including a light source, an optical fiber, and an optical system positioned to image the light from the light source. The light source can be an edge-emitting semiconductor laser or some other device that provides a large-angle emitted light distribution. The optical system reduces the angular spread of the light distribution but distributes the light from the light source across a volume rather than focusing the light onto a single image plane.

One example of the optical system includes a diffractive lens and has a first focal point for a first portion (e.g., one half) of light from the light source and a second focal point for a second portion (e.g., the other half) of the light from the light source. The optical fiber has an input face between two image planes of the bifocal lens. The power coupling efficiency is insensitive to misalignment because the power density in the volume between the two image planes is nearly constant. Additionally, the bifocal or multi-focal optical system reduces the angular size of the light distribution and thereby provides an acceptable coupling efficiency even for a single-mode optical fiber, which has a low numerical aperture.

The device can provide relaxed alignment tolerance for a single optical channel or for multiple optical channels that are integrated into the same structures. Accordingly, a multi-channel optical transmitter that lacks the freedom of separate alignment for each channel provides a high coupling efficiency even for the channels that do not have their ideal alignment.

Another embodiment of the invention is a method for coupling light into an optical fiber. The method generally includes spreading the light over a volume that in each dimension is larger than the alignment accuracy of the optical fiber. Spreading the light can be performed using a bifocal optical element that provides a nearly uniform optical irradiance through each cross-section of the volume. When using a bifocal lens, the volume extends between the first and second image planes of the bifocal lens. The input face of the optical fiber can be placed anywhere within the volume and can still provide a consistent and acceptable coupling efficiency.

BRIEF DESCRIPTION OF THE DRAWINGS

Use of the same reference symbols in different figures indicates similar or identical items.

DETAILED DESCRIPTION

In accordance with an aspect of the invention, an optical coupler has an optical system that converts laser light into a small angle distribution that is spread uniformly throughout a volume. The volume's dimensions are large relative to the size of the input face of an optical fiber, and whenever the input face of an optical fiber is in the volume, the amount of optical power coupled into the optical fiber is approximately the same. The volume can be enlarged and expanded laterally to relax the tolerance for lateral movement or alignment errors and/or elongated axially to relax tolerance for axial movement or alignment errors. In one embodiment, the volume includes a cylinder with a circular cross-section so that the input face of the optical fiber can move anywhere within the cylinder without significantly changing the coupling efficiency.

A bifocal lens can convert the light from a laser into a distribution having the desired image volume. A bifocal lens preferably focuses one half of the incident light to a first image plane and the other half of the incident light to a second image plane. Using a high magnification reduces the angular distribution of the converging light in the respective image planes. Generally, half of the laser light converges in front of the input face of the fiber and the remaining half of the laser power converges behind the input face of the fiber. Accordingly, between the image planes, half of the laser light is expanding from the front image plane and therefore becoming dimmer, and the other half of the laser light is converging toward the second image plane and therefore becoming brighter. The net effect is a uniform or constant power coupling into the optical fiber at all positions in a cylindrical volume between the image planes. The numerical apertures of the beams and the separation of the focal points of the bifocal lens control the diameter, length, and power density of the cylindrical volume.

Figure 1:
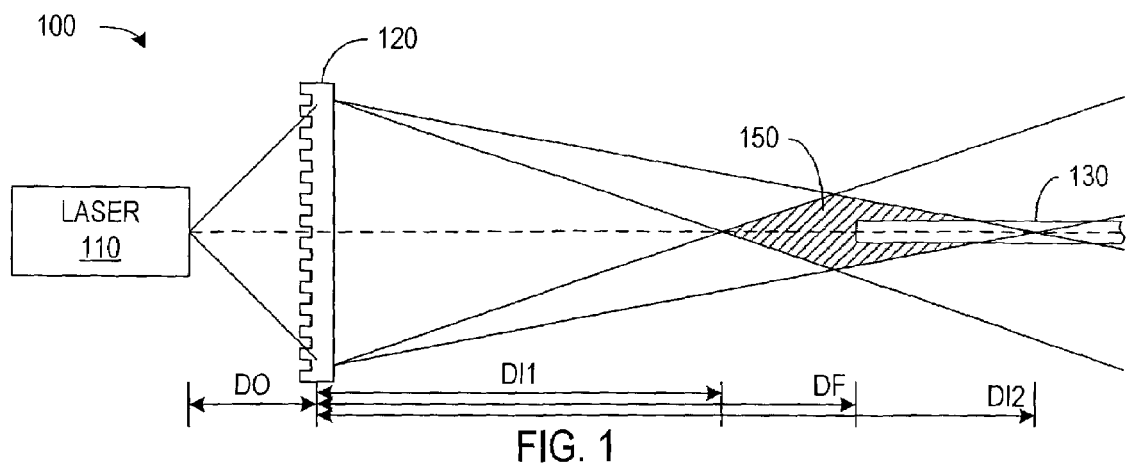
FIG. 1 shows an optical transmitter in accordance with an embodiment of the invention employing a bifocal diffractive element.

FIG. 1 is a block diagram of an optical coupler 100 in accordance with an exemplary embodiment of the invention. Optical coupler 100 includes a light source 110, a lens element 120, and an optical fiber 130. Optical coupler 100 also includes mounting or packaging structures (not shown) such as used for conventional optical transmitters. The mounting holds light source 110, lens element 120, and optical fiber 130 in the proper orientations and positions as described further below. Examples of some known mounting or packaging structures suitable for an optical coupler are in U.S. Pat. No. 6,112,002, entitled "Optical Coupler Optically Coupling a Light Beam of a Semiconductor Laser Source with a Single Mode Optical Waveguide or Fiber", U.S. Pat. No. 6,112,001, entitled "Optical Coupler and a Method of Producing It", and U.S. Pat. No. 5,680,493, entitled "Optical Coupler". The particular structures optical coupler 100 employs for holding light source 110, lens element 120, and optical fiber 130 are not critical to the present invention particularly because embodiments of the invention relax alignment tolerances and permit use of mounting or packaging systems that might not provide the stability or precision required for some prior optical couplers or transmitters.

Light source 110 is typically a device such as an edge-emitting semiconductor laser that can have a relatively large-angle distribution for emitted light, but other light emitting devices such as a vertical cavity surface emitting laser (VCSEL) or a light emitting diode (LED) could also be used. Alternatively, light source 110 may include an optical fiber or a waveguide (not shown) that delivers light from a remote laser or other light source.

Lens element 120 in FIG. 1 is a diffractive bifocal lens. Manufacturing techniques and structures for a diffractive lens element having a single focal point are well known and can also be used for bifocal diffractive lens 120. Diffractive lens 120, as illustrated in FIG. 1 has one surface that is contoured or patterned as required to create a bifocal lens. Diffractive lenses can alternatively be contoured on opposite surfaces or constructed by forming an opaque pattern having apertures that act to diffract incident light onto the desired image planes. Still other structures for diffractive lenses include but are not limited to spatial light modulators having an electrically programmable pattern, a substrate doped to have a graded index pattern, or a structure with a combination of diffractive and refractive features.

Figure 2:
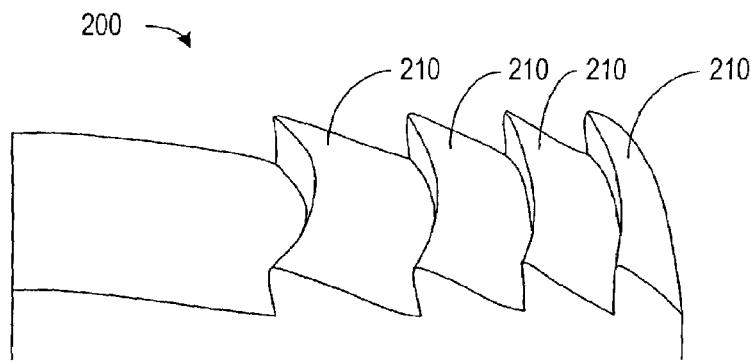
FIG. 2 is a perspective view of a diffractive lens.

FIG. 2 shows the surface contours of a conventional diffractive lens 200 having a single focal length f1 for monochromatic light. In particular, diffractive lens 200 has ridges 210 with spacing and shapes selected so that diffraction of monochromatic light incident parallel to diffractive lens 200 focuses a fraction of the incident light at focal length f1 of the diffractive lens 200. The heights and shapes of ridges 210 can generally be adjusted to select the percentage of the incident light focused at the focal length f1 and the percentage of light transmitted through diffractive lens 200 without being focused.

Figure 3:
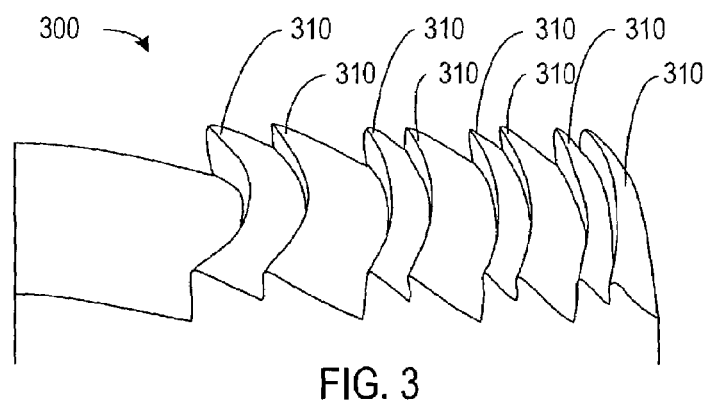
FIG. 3 is a perspective view of a bifocal diffractive lens in accordance with an embodiment of the invention.

FIG. 3 illustrates the surface contours of a bifocal diffractive lens 300 having a surface with ridges 310 that provide two focal lengths f1 and f2. A design process for bifocal diffractive lens 300 can begin with determining the first phase function that defines a surface contour for a conventional diffractive lens 200 having focal length f1. Any conventional techniques for diffractive lens design can be used. In particular, commercial software such as GLAD from Applied Optics Research, Inc. or DIFFRACT from MM Research, Inc. can analyze the phase functions of diffractive elements. A second phase function is similarly generated, wherein the second phase function is such that if the second phase function were multiplexed together with the first phase function, the combination would provide a diffractive lens having the second focal length f2. The second phase function is then scaled so as to provide a partially efficient diffractive lens that focuses a percentage (e.g., 50%) of the incident light but passes the remainder (e.g., 50%) of the incident light unperturbed. The first phase function and the scaled second phase function are multiplexed together to form a final bifocal lens design.

Conventional photolithographic etching techniques can etch a substrate to form or approximate the desired surface contours that form a bifocal diffractive lens. In an exemplary embodiment of optical coupler 100 of FIG. 1, light source 110 produces light having a wavelength of about 1310 nm, and lens element 120 is formed from silicon, which is transparent to 1310-nm light. Methods for accurately etching silicon substrates are well known in the field of integrated circuit manufacture and can approximate sloped contours using stair step levels if necessary.

Figure 4:
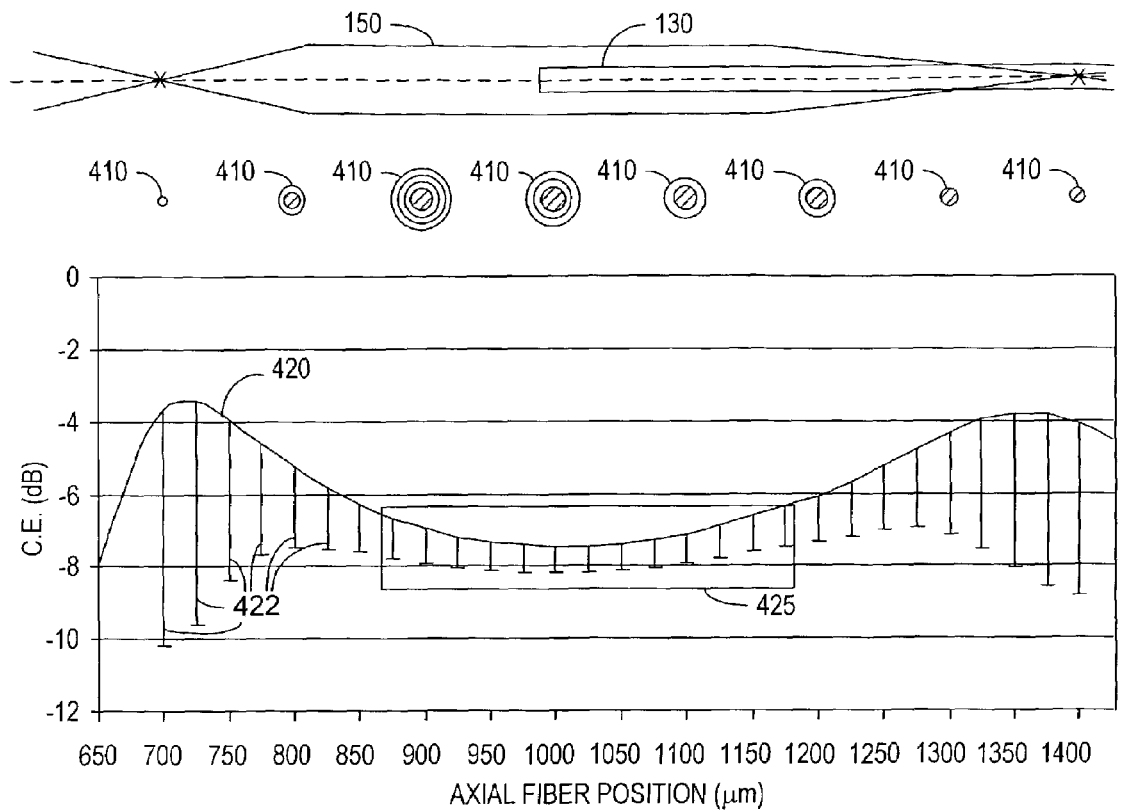
FIG. 4 illustrates the relationship between coupling efficiency and the position of an optical fiber in an embodiment of the optical transmitter of FIG. 1.

FIG. 4 illustrates power distribution and the coupling efficiency of optical coupler 100 of FIG. 1 as a function of an axial distance DF between optical fiber 130 and bifocal lens 120. In the exemplary embodiment, bifocal lens 120 has a first focal length f1 of about 700 $\mu$m and a second focal length f2 of 1400 $\mu$m. Light source 110 is at an object distance DO of about 200 $\mu$m relative to bifocal lens 120. This configuration achieves an average magnification of about 5× and a corresponding decrease in the angular distribution of the light at both image planes.

Volume 150 in FIG. 4 represents a range of positions at which the input face of optical fiber 130 can be placed without causing an unacceptable variation in the coupling efficiency. In volume 150, optical power distribution 410 varies from being sharply focused at the positions DI1 and DI2 of the front and back image planes, to being wider between the front and back image planes. Power distributions 410 in FIG. 4 represent cross-sectional areas that contain an optical irradiance above a threshold level that provides at least the minimum desired power coupling into optical fiber 130. Diffractive lens 120 beneficially filters or removes elliptical asymmetry from the light distribution so that power distributions 410 are less elliptical than the original light distribution from light source 110. Diffractive lens 120 thus further reduces coupling efficiency variations caused by light sources such as edge-emitting semiconductor lasers that tend to generate elliptical light distributions.

The illustrated diameters of distributions 410 along the optical axis indicate the tolerances for lateral (or off-axis) misalignment or movement of optical fiber 130. Error bars 422 on plot 420 further illustrate the effect that a lateral shift of ±5 $\mu$m has on the coupling efficiency when optical fiber 130 is at different axial positions. In the exemplary embodiment, light distribution 410 has a slowly varying intensity across a diameter of at least 25 $\mu$m for axial locations in a range 425 between the focal points.

Plot 420 shows that the coupling efficiency varies by less than about two decibels when the axial position of the input face of optical fiber 130 is on the optical axis and within range 425. The nominal coupling efficiency in range 425 is about 17%, which is an improvement over the less than 10% coupling efficiency, which could be achieved using traditional butt-coupling techniques. The coupling efficiency of optical coupler 100 in the exemplary embodiment is less than the near 100% peak coupling efficiency that is theoretically achievable with a lens that sharply focuses light on the input face of an optical fiber. However, with a single sharp focus, a misalignment or shift of the optical fiber by 5 $\mu$m can cause a significant drop (e.g., −7 dB) in the coupling efficiency. In contrast, the alignment tolerance for optical fiber 130 relative to bifocal lens 120 is many times higher than would be allowed in a conventional optical coupler. In the exemplary embodiment, a misalignment or shift of optical fiber 130 by 5 $\mu$m decreases coupling efficiency by only about −0.7 dB.

Figure 5:
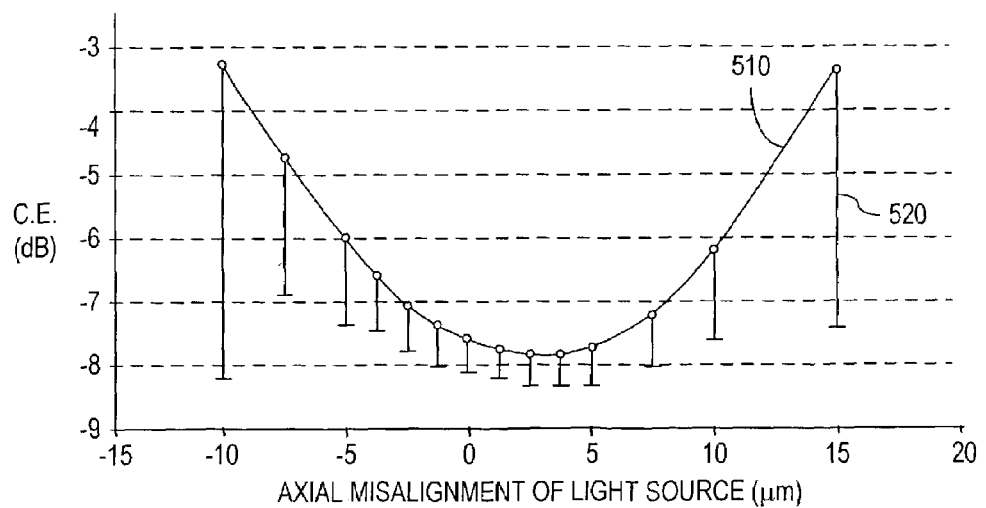
FIG. 5 illustrates the relationship between coupling efficiency and the position of a light source in an embodiment of the optical transmitter of FIG. 1.

FIG. 5 shows how misalignment of light source 110 changes the coupling efficiency in the exemplary embodiment of optical coupler 100 of FIG. 1. In FIG. 5, a plot 510 indicates the dependence of the coupling efficiency on axial misalignment of light source 110, and error bars 520 indicate the change in the coupling efficiency that 5-$\mu$m lateral misalignments of fiber 130 cause for respective axial positions of light source 110.

A shift or misalignment in the position of light source 110 generally causes a magnified shift in the position of volume 150, depending on the magnification in optical coupler 100. For a 5× magnification, a lateral shift or misalignment of light source 110 by a distance Y relative to the optical axis laterally shifts volume 150 by a distance of about 5Y, and an axial shift or misalignment of light source 110 by a distance Z axially shifts volume 150 by a distance of about 25Z. Even with this magnification, the length of volume 150 is such that axial misalignment of light source 110 by up to 5 $\mu$m changes the coupling efficiency by less than about 0.7 dB. An active alignment process that laterally aligns optical fiber 130 to the position of light source 110 can remove the effect of lateral position of light source 110 so that variations in the coupling efficiency due to lateral misalignment are limited by the lateral alignment accuracy of optical fiber 130. Accordingly, even with an active lateral alignment process that is only accurate to ±5 $\mu$m, variations in the coupling efficiency are less than about 0.7 dB.

The relaxed tolerances for misalignment allow manufacture of optical coupler 100 using a simple, high-volume process. In particular, light source 110, lens element 120, and optical element 130 can be aligned mechanically using alignment marks or other visible indicia for control of the relative placement of elements 110, 120, and 130. After the mechanical alignment, an active fine-tuning process activates light source 110 and laterally aligns optical fiber 130 based on the observed optical power transmitted on optical fiber 130. The active alignment need only be to within ±5 $\mu$m in the exemplary embodiment of the invention, instead of within ±1 $\mu$m, which may be required for alignment of conventional optical couplers for single-mode optical fibers. Further, axial alignment of optical fiber 130 can rely solely on visual or mechanical alignment techniques, without requiring a time-consuming active process that measures the optical irradiance coupled into the optical fiber and then adjusts the axial position of the optical fiber according to the measurements.

The exemplary embodiment of the invention shown in FIG. 1 employs a diffractive bifocal element 120 to generate the desired volume 150 that provides a narrowed angular distribution, a uniform power coupling into optical fiber 130, and relaxed tolerances for misalignment. Other optical elements may similarly spread the light from a light source and provide similar relaxations of the misalignment tolerances. For example, a refractive bifocal or multi-focal lens may also be able to uniformly spread the optical irradiance from light source 110. A refractive lens could, for example, include a circular lens surrounded by multiple annular lenses with focal lengths that vary from one annular lens to the next. Alternatively, a refractive lens could include upper and lower half lenses or a set of pie-piece lens sections. However, interference between coherent light from different lens sections must be taken in to account to avoid interference effects that create unacceptable variations (i.e., distinct interference maxima or minima) within the volume defining the tolerance for misalignment. Additionally, care must be taken to prevent the coupling efficiency from depending on variations in the size or shape of the light pattern from light source 110. Diffractive lenses have the desirable property of spreading all incident light equally instead of having different focuses for different lens sections or areas.

Figure 6:
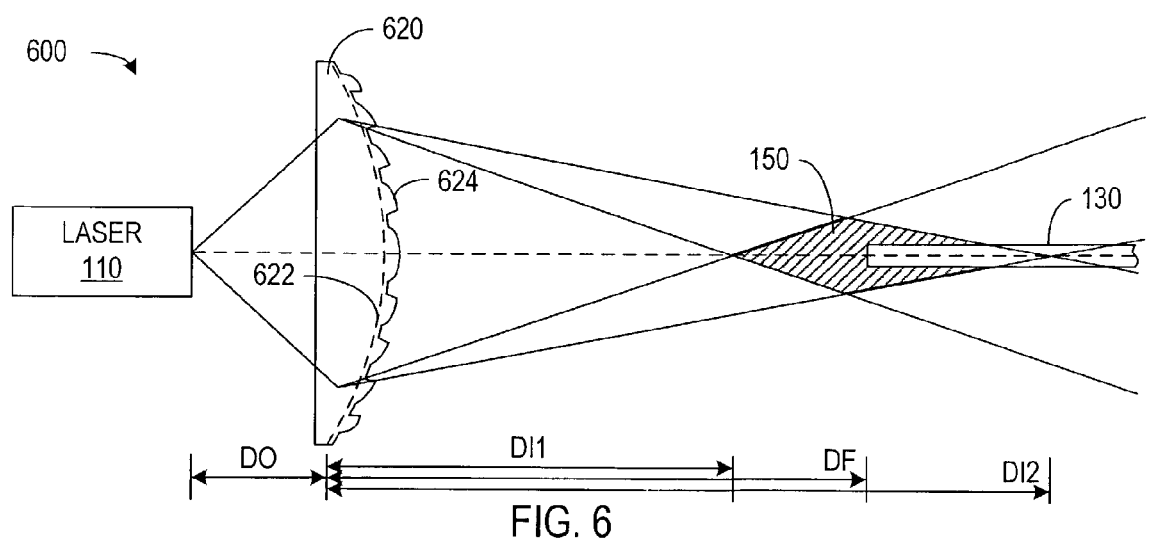
FIG. 6 shows an optical transmitter in accordance with an embodiment of the invention employing a hybrid diffractive/refractive element.

FIG. 6 illustrates an optical coupler 600 having a hybrid diffractive/refractive element 620. Hybrid diffractive/refractive element 620 spreads the light from light source 110 over volume 150 to expand the alignment tolerance for optical fiber 130 as described above. In one embodiment, hybrid diffractive/refractive lens 620 has at least one surface with a curvature 622 for one focal length, e.g., f2. Further, diffractive features 624 of a partially efficient diffractive lens are superimposed on one or both surfaces of hybrid diffractive/refractive lens 620 so that the combination provides two focal length f1 and f2 for separate fractions of the incidence light. In FIG. 6, diffractive features 624 are on curvature 622, but many alternative configurations are possible. For example, the diffractive and refractive surfaces could be opposite each other, or a diffractive element and a refractive element, which are separate elements, can together form a hybrid diffractive/refractive bifocal lens.

Figure 7:
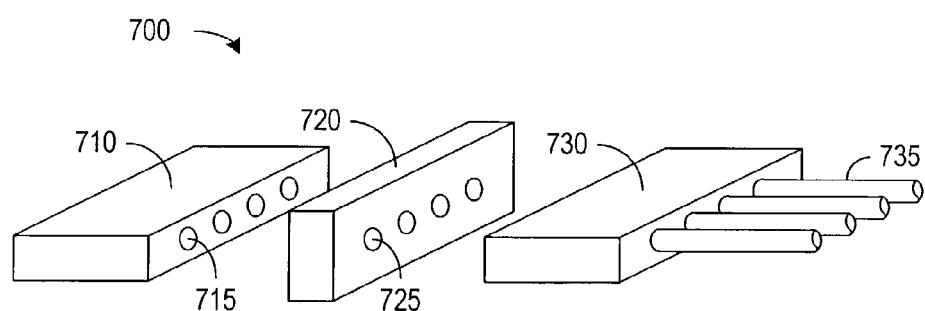
FIG. 7 illustrates a multi-channel optical transmitter in accordance with an embodiment of the invention.

Principles of the present invention such as illustrated in the single channel optical coupler 100 or 600 also benefit multi-channel optical transmitters and couplers. FIG. 7 shows a multi-channel optical transmitter 700 in accordance with an embodiment of the invention. Optical transmitter 700 includes an integrated array 710 including multiple edge-emitting semiconductor lasers 715 on a monolithic die, an optical die 720 including multiple bifocal diffractive lenses 725, and a fiber assembly 730 including multiple optical fibers 735. Semiconductor processing techniques used in the manufacture of integrated array 710 and optical die 720 precisely control the relative positions or pitch of lasers 715 in integrated array 710 and bifocal diffractive lenses 725 in optical die 720. Alternatively, the relaxed alignment tolerances may allow for assembly of individual dies (instead of having multiple components on a monolithic die) to form a multi-channel transmitter. A typical structure for fiber assembly 730 mounts optical fibers 735 in V-grooves that can be formed in a substrate with precisely controlled spacing using photolithographic patterning and etching or precision machining.

The integration of multiple lasers 715, lenses 725, and optical fibers 735 in multi-channel optical transmitter 700 increases misalignments because the alignment of components 710, 720, and 730 at best provides an average alignment for the channels, and each channel includes a laser 715, a diffractive bifocal lens 725, and an optical fiber 735 that may not be optimally aligned. In accordance with an aspect of the invention, bifocal lens 725, which relaxes the alignment tolerances, allows each channel to provide a consistent power coupling even though the average alignment may not be optimal for one or more of the channels.

Although the invention has been described with reference to particular embodiments, the description is only an example of the invention's application and should not be taken as a limitation. In particular, exemplary embodiments of the invention containing bifocal lenses are described, but multi-focal optical systems having more than two focal lengths can similarly spread optical irradiance to relax alignment tolerance in other embodiments of the inventions. Various other adaptations and combinations of features of the embodiments disclosed are within the scope of the invention as defined by the following claims.

What is claimed is:

1. A device comprising:
    a light source;
    an optical fiber having a face that permits entry of light from the light source into the optical fiber; and
    an optical system positioned to shape the light, wherein the optical system focuses a first half of the light onto a first plane that is in front of the face of the optical fiber and focuses a second half of the light onto a second plane that is behind the face of the optical fiber.

2. The device of claim 1, wherein the optical system comprises a bifocal lens.

3. The device of claim 2, wherein the bifocal lens comprises a diffractive lens.

4. The device of claim 1, wherein the optical fiber is a single mode optical fiber.

* * * * *